(12) United States Patent
Madani et al.

(10) Patent No.: US 8,364,820 B2
(45) Date of Patent: Jan. 29, 2013

(54) DATA CENTER RESOURCE USAGE AND COST DETERMINATION

(75) Inventors: Habib Madani, Richardson, TX (US); Zeeshan Naseh, Richardson, TX (US); Mihaita Prunoiu, Plano, TX (US)

(73) Assignee: Cisco Technology Inc., San Jose, CA (US)

( * ) Notice: Subject to any disclaimer, the term of this patent is extended or adjusted under 35 U.S.C. 154(b) by 308 days.

(21) Appl. No.: 12/791,117

(22) Filed: Jun. 1, 2010

(65) Prior Publication Data

US 2011/0296024 A1 Dec. 1, 2011

(51) Int. Cl.
*G06F 15/173* (2006.01)

(52) U.S. Cl. ......... 709/226; 709/223; 709/224; 709/225

(58) Field of Classification Search ........... 709/223–226
See application file for complete search history.

(56) References Cited

U.S. PATENT DOCUMENTS

| | | | |
|---|---|---|---|
| 7,082,463 B1 | 7/2006 | Bradley et al. | |
| 7,467,192 B1 | 12/2008 | Lemler et al. | |
| 7,627,671 B1 * | 12/2009 | Palma et al. | 709/224 |
| 7,802,012 B2 | 9/2010 | Simonis | |
| 7,843,856 B2 | 11/2010 | Ramakrishnan et al. | |
| 8,171,485 B2 * | 5/2012 | Muller | 718/104 |
| 2009/0292654 A1 * | 11/2009 | Katiyar et al. | 705/412 |
| 2012/0041899 A1 * | 2/2012 | Greene et al. | 705/400 |
| 2012/0054763 A1 * | 3/2012 | Srinivasan | 718/104 |
| 2012/0089980 A1 * | 4/2012 | Sharp et al. | 718/1 |

\* cited by examiner

*Primary Examiner* — Mohamed Wasel
(74) *Attorney, Agent, or Firm* — Edell, Shapiro & Finnan, LLC

(57) ABSTRACT

Techniques are provided to derive a virtual machine workload cost for a data center. At a network management appliance that is in communication with network resources and computing resources used by a plurality of virtual machines executed by the computing resources for providing one or more services, usage metrics are collected from network components of the network resources operating with respect to traffic that passes through the network resources as a result of the plurality of virtual machines executed by the computing resources. The virtual machine workload cost is computed from the usage metrics.

20 Claims, 6 Drawing Sheets

DATA CENTER RESOURCE USAGE AND COST DETERMINATION

TECHNICAL FIELD

The present disclosure relates to data center computing environments and to determining a usage cost for services provided by the data center.

BACKGROUND

Data centers are used to provide computing services to one or more users such as business entities, etc. The data center comprises a plurality of computing elements such as server computers that run a plurality of virtual machine processes. The output of the virtual machine processes is supplied over network resources to the one or more users.

The data center workload at any given time reflects the amount of resources necessary to provide one or more services. The workload is helpful in adjusting the allocation of resources at any given time and in planning for future resource allocation planning and to determine an appropriate charge back cost to the users. Current workload cost techniques are cumbersome, inaccurate and inflexible.

DESCRIPTION OF EXAMPLE EMBODIMENTS

Overview

Techniques are provided to derive a virtual machine workload cost for a data center. At a network management appliance that is in communication with network resources and computing resources used by a plurality of virtual machines executed by the computing resources for providing one or more services, usage metrics are collected from network components of the network resources operating with respect to traffic that passes through the network resources as a result of the plurality of virtual machines executed by the computing resources. The virtual machine workload cost is computed from the usage metrics.

Example Embodiments

Figure 1:
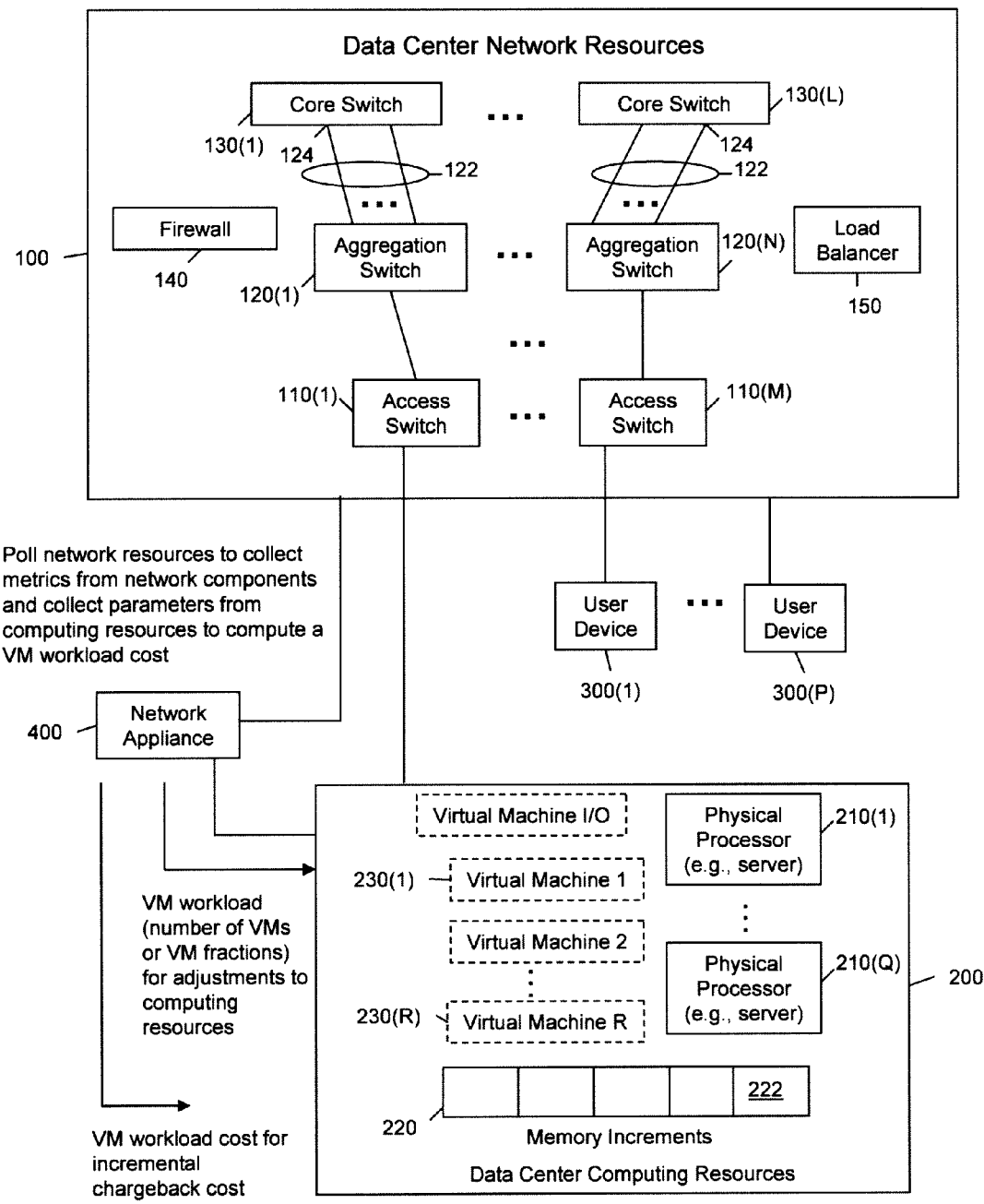
FIG. 1 is an example of a system block diagram showing a data center environment for which workload is determined from metrics collected from network components and computing resources that support the services provided by the data center.

Reference is first made to FIG. 1. FIG. 1 shows a data center 10 that is configured to provide data center services to one or more users. The data center 10 comprises data center network resources 100 and data center computing resources 200. The data center network resources 100 comprise a variety of network components that are used to supply networked communications between the data center computing resources 100 and one or more users shown at 300. Generally, the data center 10 provides one or services for one or more users through the functions of the network resources 100 and the computing resources 200.

The network resources 100 comprises network components including access switches 110(1)-110(M), aggregation switches 120(1)-120(N), core switches 130(1)-130(L), a firewall component 140 and a load balancer component 150. There may be additional components in the network resources 100, but those shown in FIG. 1 are meant to be representative. Each core switch has multiple ports 124 that connect to a corresponding one of the aggregation switches by corresponding ones of the connections 122 shown in FIG. 1. Each aggregation switch 120(1) is connected to a plurality of access switches, but for simplicity in FIG. 1, a single instance of a connection between an aggregation switch and an access switch is shown. As will become more apparent hereinafter, a virtual machine workload cost is computed from a sum of core costs computed for each port on a core switch based on traffic that passes through network components associated with a corresponding port of the core switch.

One or more user devices 300(1)-300(P) connect to the data center network resources 100 in order to receive one or more services provided by the data center 10. To this end, the computing resources 200 is connected to the network resources 100. The computing resources 200 comprise one or more physical processors (servers) 210(1)-210(Q) and memory 220. Memory 220 is shown comprising a plurality of memory increments 222. The memory increments 222 are shown in this manner for illustrative purposes and not as a logical representation of the organization of the memory. The intent for illustrating the memory increments 222 is to show how portions of the memory may be allocated to one or more processes executed by one or more of the physical processors 210(1)-210(Q). To this end, the physical processors 210(1)-210(Q) execute software for one or more virtual machine processes shown at 230(1)-230(R).

The data center 10 provides services to one or more of the user devices 300(1)-300(P) by executing appropriate ones of the virtual machines 230(1)-230(R). In so doing, data and controls will flow between the user devices 300(1)-300(P) and the computing resources 200 via the network resources 100, inherently taking up bandwidth and thus burdening the network resources, depending on the nature of the services provided to the user devices 300(1)-300(P).

A network appliance 400 is provided to poll the network resources 100 and the computing resources 200 to collect usage metrics in order to compute a virtual machine (VM) workload cost. That is, the network appliance 400 collects usage metrics from network components in the network resources 100 and from the computing resources 200. The VM workload cost in terms of the number of VMs (or fraction of a VM), is fed back to the computing resources 200 to handle the workload associated with one or more user devices 300(1)-300(P). In addition, the VM workload cost is useful to compute an incremental chargeback amount for services provided to one or more user devices. In other words, the VM workload cost is used to determine how much to charge a customer for use of the data center 10.

Figure 2:
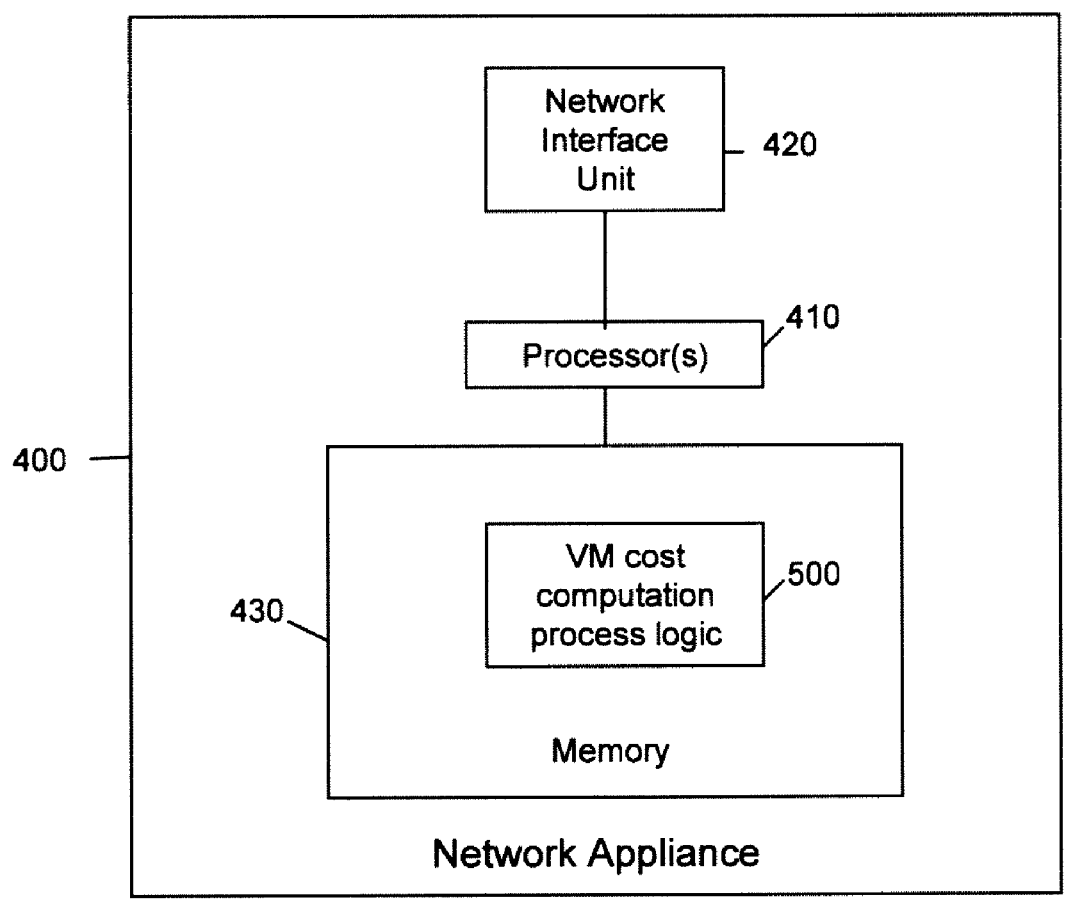
FIG. 2 is an example of a block diagram of a network appliance apparatus that is configured to determine a virtual machine workload cost for the data center based on metrics collected from network components and the computing resources.

Reference is now made to FIG. 2. FIG. 2 shows an example of a block diagram for the network appliance 400. The network appliance 400 may be any device configured with network connectivity and sufficient computation capabilities to perform the techniques described herein. The network appliance comprises a processor 410 (or multiple processors), a network interface unit 420 and computer readable memory 430. The processor 410 is, for example, a microprocessor or microcontroller. The network interface unit 420 is, for example, an Ethernet card device, that is configured to enable network communications with other devices, such as network components in the network resources 100 and with the computing resources 200. The computer readable memory 430 is, for example, random access memory (RAM) or read only memory (RAM) or other suitable memory that the processor 410 reads to execute one or more instructions stored or encoded therein. To this end, the memory 430 stores or is encoded with instructions for VM cost computation process logic 500. The VM cost computation process logic 500, when executed by the processor 410, causes the processor to perform the VM cost computations described hereinafter in connection with FIGS. 3-7.

The processor(s) 410 may be a programmable processor or a fixed-logic processor. In the case of a programmable processor, the memory 430 is any type of tangible computer readable memory (e.g., random access, read-only, etc.) that is encoded with or stores instructions. Alternatively, the processor(s) 410 may a fixed-logic processing device, such as an application specific integrated circuit or digital signal processor, that is configured with firmware comprised of instructions that cause the processor(s) 410 to perform the functions described herein. Thus, instructions for the VM cost computation process logic 500 may take any of a variety of forms, so as to be encoded in one or more tangible media for execution, such as with fixed logic or programmable logic (e.g., software/computer instructions executed by a processor) and the processor(s) 410 may be a programmable processor, programmable digital logic (e.g., field programmable gate array) or an application specific integrated circuit (ASIC) that comprises fixed digital logic, or a combination thereof. In general, the instructions for the VM cost computation process logic 500 may be embodied in a processor or computer readable tangible medium that is encoded with instructions for execution by a processor (e.g., processor 410) that, when executed by the processor(s) 410, are operable to cause the processor to perform the functions described herein in connection with process logic 500.

Figure 3:
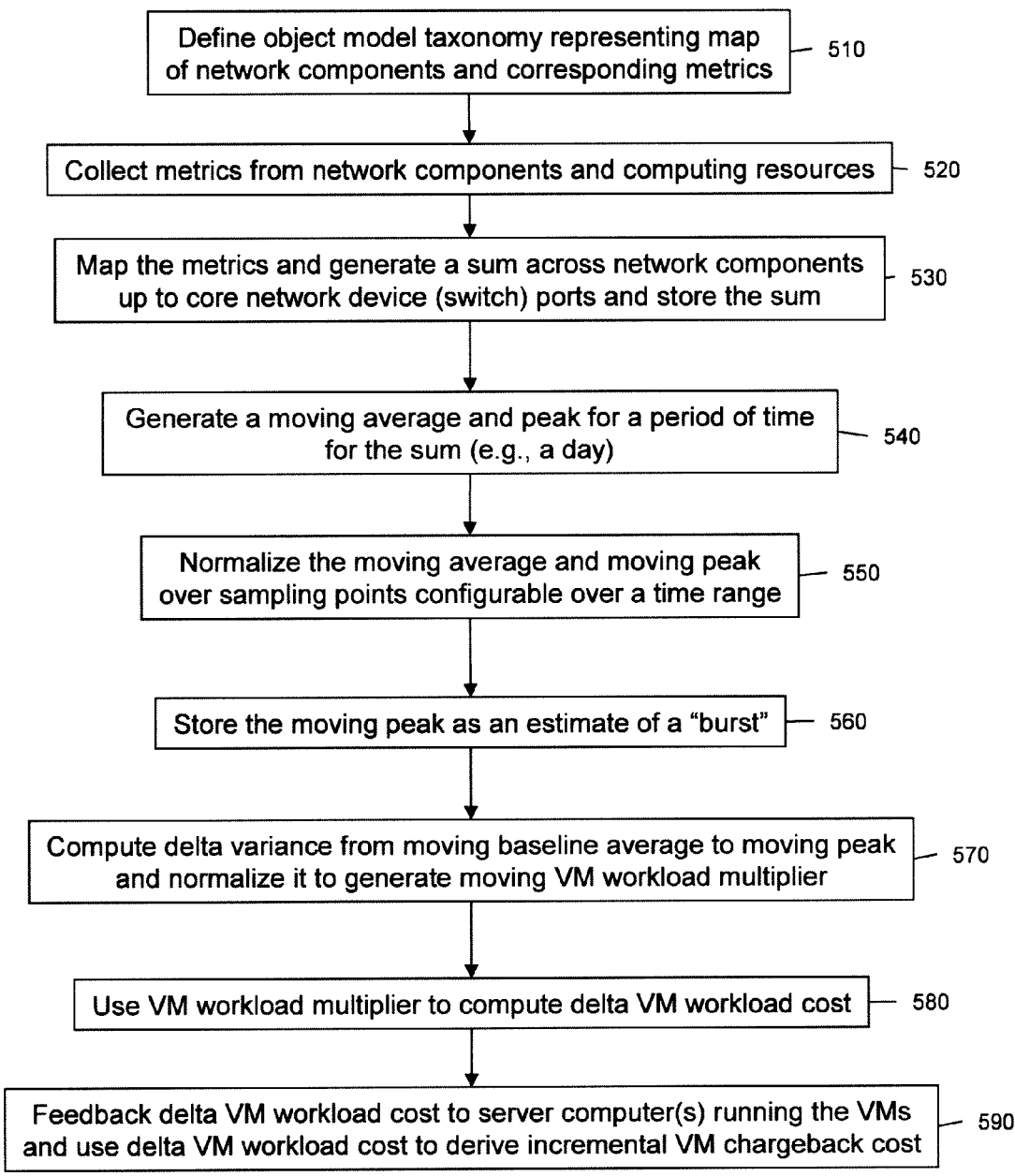
FIG. 3 is an example of a flow chart for a process to determine the virtual machine workload cost.

Reference is now made to FIG. 3, in conjunction with FIGS. 1 and 4-7, for a description of an example of the process logic 500. Generally, the process logic 500 operates to collect usage metrics from network components of the network resources 100 with respect to traffic that passes through the network resources 100 as a result of the plurality of virtual machines 230(1)-230(R) executed by the computing resources 200, and to compute a VM workload cost from the usage metrics. The variations in network traffic, as represented by the usage metrics, are used to compute the VM workload cost through a series of computations as described hereinafter.

Figure 4:
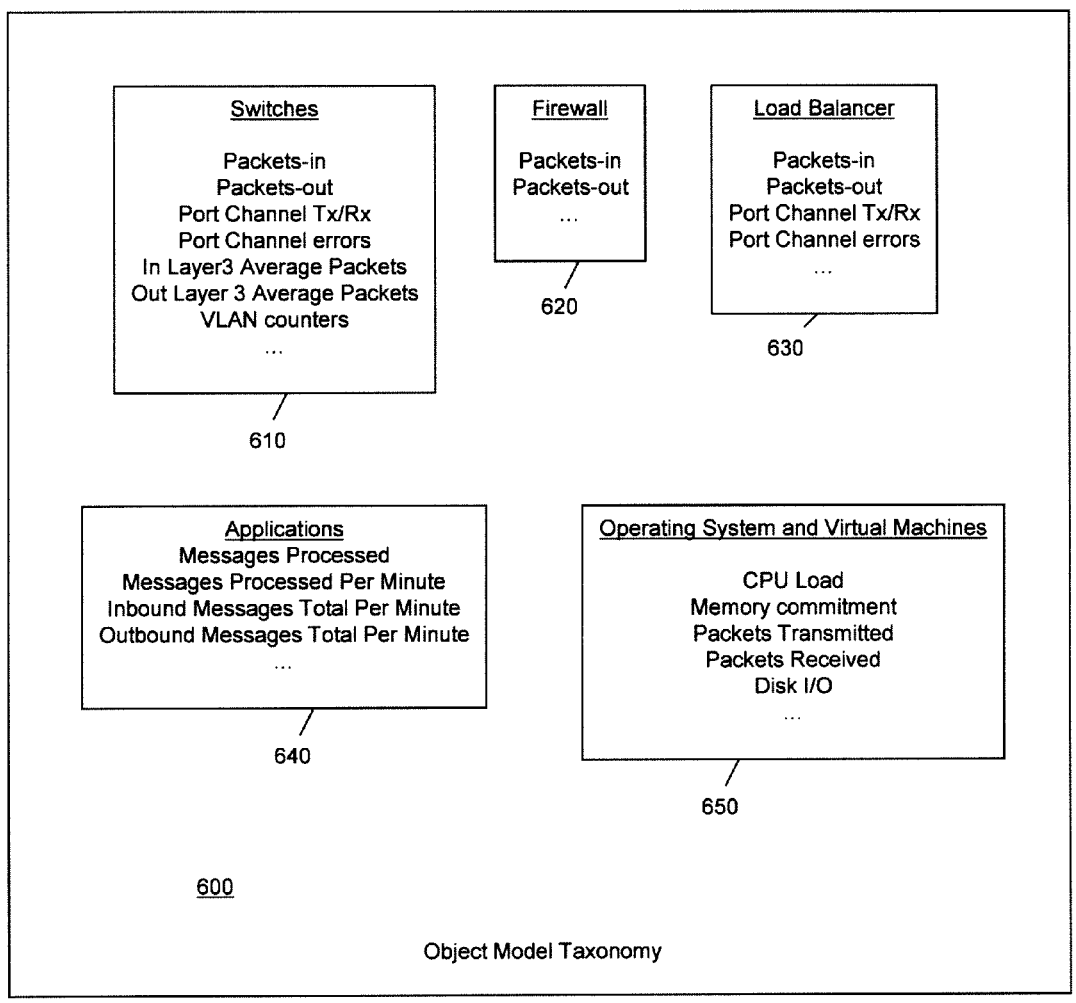
FIG. 4 is an example of a diagram depicting an example of a taxonomy of usage metrics that are collected from the network components and the computing resources to compute the virtual machine workload cost.

At 510, an object model taxonomy is defined that represents a map of network components in the network resources 100 and applications in the computing resources 200 and their corresponding metrics. FIG. 4 shows a diagram showing categories of network components of the network resources 100 and application or other processes of the computing resources 200. The object model taxonomy shown at reference numeral 600 is a hierarchical representation of the various components or processes by function type. For example, at 610, metrics are collected for switches in the network resources 100, whether those switches serve as core switches, aggregation switches or access switches. In addition, metrics for components related to packet forwarding or switching functions are also mapped to switch metric data 610. Examples of switch metric data 610 include number of or rate of arriving packets (Packets-in), number of outgoing packets (Packets-out), number of or rate of packets on a Port Channel transmitted (Tx) and received (Rx), Port Channel errors, average rate of incoming packets at Layer 3 (In Layer3 Average Packets), average rate of outgoing packets at Layer 3 (Out Layer 3 Average Packets), etc. These metrics are captured from a variety of devices or processes that are part of the switch or routing functions in the network resources 100. Similarly, firewall metrics are collected as shown at 620, including number of or rate of packets inbound to the firewall (Packets-in) and number of or rate of packets outbound from the firewall (Packets-out). Load balancer metrics are collected as shown at 630, including number of or rate of packets inbound to the load balancer (Packets-in) and number of or rate of packets outbound from the load balancer (Packets-out), and as well as Port Channel related statistics. The additional metrics or statistics beyond number or rate of packets in and out of component provides for additional granularity into the performance of a component. Examples of other network component related statistics or metrics include port speed, latency and rate of packet arrival for the access switches, the firewall, and aggregation switches.

Still referring to FIG. 4, performance metrics related to applications running in the computing resources 200 are collected as shown at 640. Examples of these metrics include number of messages processes, number of messages processed per time interval (e.g., minute), inbound messages per time interval and outbound messages per time interval. Other processes running in the computing resources 200 for which metrics are collected include operating system and virtual machines, the metrics for which are shown at 650. Examples of these metrics include CPU load, memory commitment (amount of memory allocated for use of a process), number of packets transmitted, number of packets received, disk I/O usage, etc.

Referring back to FIG. 3, at 520, the network appliance 400 polls the various network components in the network resources 100 and also the computing resources 200 to collect metrics/statistics from network components in the network resources 100 and from the computing resources 200.

A series of computations are made at operations 530-580. The VM workload cost, $VM_{workloadcost}$=Initial VM Cost×(1+Kadj). The Initial VM Cost is a fixed static amount that is calculated from a "balance sheet" for the data center.

The factor "Kadj" is a VM workload adjustment factor that is computed as:

$Kadj=K_{availability}$ factor×$K_{performance}$ factor, where $K_{performance}=K_{degradation}\times K_p$. $K_{degradation}$ is a performance degradation factor that is derived from tables described below.

$K_p$ is the factor that is computed through a series of computations described hereinafter.

Each VM 230(1)-230(R) in the computing resources 200 is grouped into a VM class. A VM class is a group or identifier based on a combination of CPU/Physical Processor usage, Core usage (if a CPU has multiple processing cores), Total memory usage, and Total disk input/output (I/O)-storage I/O requirements.

TABLE 1

Initial Cost Calculation

| VM Class | Hardware Physical CPU × Nr of Cores per CPU | Hardware Total Memory | Hardware Total Disk | Hardware Total I/O | Hardware Labor Cost for maintenance - FTE cost |
|---|---|---|---|---|---|
| Large Medium Small | Optimum value for (CPU × Cores)/(VCpu) | Optimum value for (Total Memory)/ (VMem)) | Optimum value for (Total Disk)/ (VDisk | Total I/O/Nr of VM's | Company based |

TABLE 2

Baseline VM Class Definitions

| Vm Class | VM ratio per Core | VM ratio per Memory | VM ratio per Disk | Limiting VM ratio |
|---|---|---|---|---|
| Large | 10 | 15 | 20 | 10 |
| Medium | 15 | 16 | 21 | 15 |
| Small | 20 | 21 | 22 | 20 |

Using a balance sheet, assumptions are made that the VM cost for a specific VM class is a certain amount, e.g., $1.00. The VM cost computed according to the techniques described herein is used to distribute the VM cost from the balance sheet across all the network metrics and thus allocate the cost of the internal network infrastructure more accurately, while at the same time recovering the cost for initial overhead provisioning made when each VM class is defined.

As a result, the proper size for the VM classes can be identified and the number of VMs per hardware physical CPU can be determined, referred to herein as VM Ratio per Core, VM Ratio per Memory and VM Ratio per Disk.

The $K_{availability}$ factor is a factor that addresses the additional overhead of the computing resources 200 that needs to be provisioned for each VM class to ensure there is always sufficient CPU capacity available to address service demands. This coefficient also addresses the VM deployment model for a regular deployment, High Availability (HA) deployment where VMs are moved automatically using a Distributed Resource Scheduler (DRS) or Fault Tolerance (FT) deployment. The $K_{availability}$ factor may incorporate other types of models where the VM is created in parallel and new access is redirected to it.

TABLE 3

The $K_{availability}$ Factor

| VM Class | Overhead | HA | FT | Normal | Other |
|---|---|---|---|---|---|
| Large | 30% | 2 | 1.5 | 1 | |
| Medium | 20% | 2 | 1.5 | 1 | |
| Small | 10% | 2 | 1.5 | 1 | |

Table 3 above provides examples of the $K_{availability}$ factor that may be offered to an external customer (user) of the data center 10. In this example, there are several classes of availability. The $K_{availability}$ factor table for each customer results from the selection of the specific availability class.

The $K_{performance}$ factor addresses the internal workload to the VM and the external workload to the VM performance under a variable number of service requests. Table 4 below is an example of a "micro burst" table used to evaluate how much additional CPU and memory are needed to be available to address micro bursts of service requests without limiting performance.

TABLE 4

The $K_{performance}$ Factor

| Burstiness Elements Performance degradation | Request Rate Increase | Duration of the Burst | Factor |
|---|---|---|---|
| 15% | 6 | 5% | 3 |
| 22% | 4 | 10% | 4 |
| 38% | 6 | 10% | 6 |
| 72% | 6 | 15% | 9 |

The Request Rate Increase is an indicator of how many times the number of packets/sec increases from an average value computed over a period of time. The Duration of Bursts indicates a monitoring interval used to collect data from external network devices. The values for performance degradation may be based on benchmark testing using a particular web server apparatus, as an example.

Another form of the Table 4 is shown below in Table 5, where a $K_{performance}$ factor is assigned for a plurality of performance degradation percentages.

TABLE 5

Microburst Table

| Factor | Performance Degradation |
|---|---|
| 1 | 5% |
| 1.5 | 8% |
| 2 | 10% |
| 2.5 | 13% |
| 3 | 15% |
| 3.5 | 19% |
| 4 | 22% |
| 4.5 | 25% |
| 5 | 30% |
| 5.5 | 34% |
| 6 | 38% |
| 6.5 | 44% |
| 7 | 50% |

Figure 5:
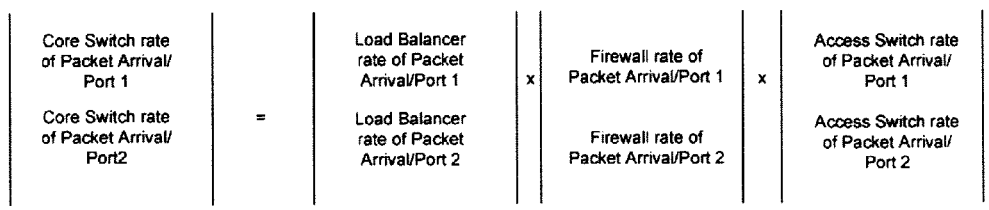
FIG. 5 is a diagram illustrating an example of a computation made for a single usage metric collected from a plurality of network components for traffic associated with corresponding ports of one or more core access switches.

At 530, the network appliance 400 maps the metrics in a linear algebra model and computes a cross product for a plurality of metrics for various metrics up to the core switch level. In other words, a cost is computed at the core switch level by computing a cost for each of a plurality of metrics associated with traffic that passes through network components (e.g., firewall, load balancer and access switches) associated with corresponding ports of one or more core switches of the network resources 100. For example, as shown in FIG. 5, a computation is made for a metric/statistic, e.g., rate of packet arrival, at a given port of a core network switch, by multiplying the rate of packet arrival at the load balancer by the rate of packet arrival at the firewall by the rate of packet arrival at the access switch to produce a rate of packet arrival at the core network switch, for two ports, Ports 1 and Ports 2. In this example, the aggregation switches are ignored, for simplicity. The same type of operation as depicted in FIG. 5 is made for other metrics/statistics across all of the relevant network components. Thus, the computation depicted in FIG. 5 involves multiplying a value for a metric collected for each of a plurality of network components to produce an aggregated metric value for the particular metric at a core switch port, where in FIG. 5, an aggregated metric value is shown for a packet arrival rate metric.

Figure 6:
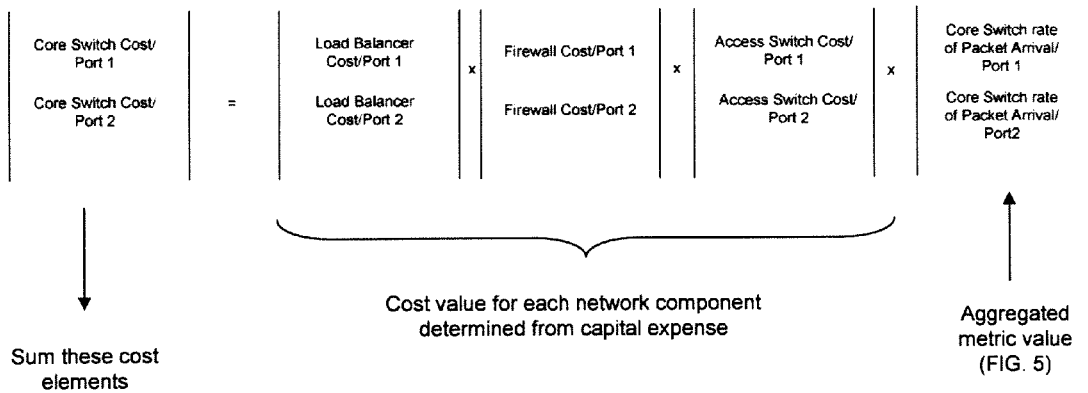
FIG. 6 is a diagram illustrating an example of a computation for a cost at a port of a core access switch from the results of the computation depicted in FIG. 5.

Next, as shown in FIG. 6, the cost at the core switch for each port is computed by using costs for each of the network components (load balancer, firewall and access switches) multiplied by the result of the computation shown in FIG. 5. This produces a plurality of core switch costs shown on the left-hand side of the equation shown in FIG. 6. The costs for the load balancer, firewall and access switch used in the computation of FIG. 6 are determined for known capital expenses associated with those components. Thus, the computation shown in FIG. 6 involves computing a core cost value for each of a plurality of metrics by multiplying the aggregated metric value (FIG. 5) by a cost value associated with each network component from which the metric was collected and used for computing the aggregated metric value to produce a core cost value for the metric.

These core switch cost values computed as depicted in FIG. 6 are summed up over all metrics and all relevant ports to produce a sum of a plurality of core cost values computed for each of a plurality of metrics. The sum of all port costs comprises Core Switch Cost/Port 1+Core Switch Cost Port 2+Core Switch Cost Port 3, . . . +Core Switch Cost Port N. This is in essence a sum of the elements in the left-hand quantity of the computation depicted in FIG. 6. Metrics may be included in the computations shown in FIGS. 5 and 6 for components and processes of the computing resources 200. Again, the example shown in FIG. 5 and FIG. 6 is only for a packet arrival metric at two ports of a core switch. The sum is stored at 530.

The statistics associated with traffic that passes through the firewall and load balancer components 140 and 150 are considered because, in general, all traffic related to services provided to one or more users by the virtual machines passes through these components.

Figure 7:
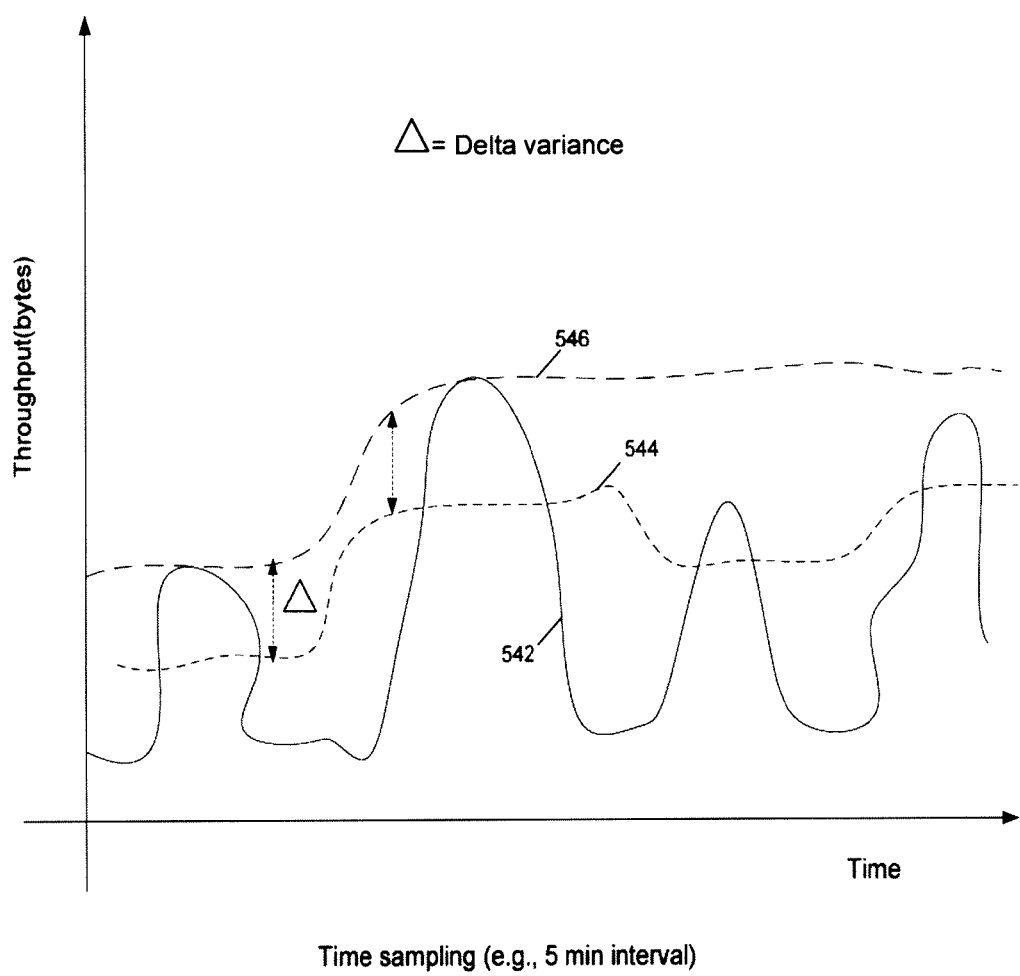
FIG. 7 is an example of a diagram illustrating an example of a plot of a sum of cost values across a plurality of core switch ports for a plurality of metrics and from which the virtual machine workload cost is derived.

At 540, the sum of core cost values computed and stored at 530 is monitored over time. For example, a moving average and a moving peak for the sum computed at 530 is generated over a period of time, e.g. one day (24 hours). Reference is made to FIG. 7. FIG. 7 shows a plot of a sum of cost values across a plurality of core switch ports for a plurality of metrics and from which the virtual machine workload cost is derived. The plot of the sum is shown at 542, a plot for a moving average of the sum is shown at 544 and a plot for a moving peak at 546. The vertical axis is in terms of throughput and the horizontal axis is in terms of time, with time sampling points that are configurable, e.g., 5 minute intervals. Referring back to FIG. 3, the moving average shown at 544 is an average of the plot of the sum 542 and serves as a baseline and at 550, is normalized over a plurality of sampling points so that it can be staled out and refreshed over time. The moving peak 546 represents the difference between the moving average 544 and the peaks of the plot of the sum 542. Data representing the moving peak is also stored at 560 and serves as an estimate of a burst of usage of network and computing resource. The moving peak is also normalized over a plurality of sampling points so that it can be staled out and refreshed over time.

Referring back to FIG. 3, at 570, a delta or difference variance between the moving average (baseline) to the moving peak is determined. This delta variance is shown in FIG. 7 as the distance between the moving average 544 and the moving peak 546, and this corresponds to $K_p$ referred to above. The delta variance is normalized to produce a moving VM workload multiplier factor. At 580, the VM workload multiplier factor is used to compute the delta VM workload cost. Specifically, the VM workload multiplier factor is the $K_{performance}$ factor referred to above and is derived from $K_p$ and $K_{degradation}$ by the computation $K_{performance}=K_{degradation} \times K_p$ also referred to above. The factor Kadj is computed from the $K_{availability}$ factor and $K_{performance}$ factor. The delta VM workload cost is computed for Kadj according to the computation $VM_{workloadcost}$=Initial VM Cost×(1+Kadj) set forth above.

Thus, the operations 540-580 involves generating and storing data representing a moving average of the sum of the plurality of core cost values over a period of time and of a moving peak of the sum of the plurality of core cost values over the period of time, and computing a difference variance between the moving average and the moving peak, wherein the VM workload cost is computed based on the difference variance between the moving average and the moving peak.

At 590, the delta VM workload cost is fed back to server computer(s), the physical servers, running the VMs in the computing resources 200. For example, the network appliance apparatus 400 generates a control signal that is fed back to the computing resources 200 to adjust allocation of computing resources used to support the one or more services based on the VM workload cost.

Also, the delta VM workload cost is used to derive an incremental VM chargeback cost. The control signal may comprise information representing an adjustment in terms of the number of VMs or fractions of a VM allocated for one or more services. A VM fraction is based on a static formula (basic CPU increment, basic memory increment, basic network increment). The VM chargeback cost may be an incremental VM chargeback cost that is passed on to a user of the data center.

While the process 500 is described herein as being performed in a network appliance apparatus that is separate from the computing resources 200, this is only by way of example. The process 500 may be performed by the computing resources 200 and to this end the process logic 500 may reside in memory 220 of the computing resources 200 and executed by one of the physical processors 210(1)-210(Q).

Thus, as described herein, a method is provided in which, at a network management appliance that is in communication with network resources and computing resources used by a plurality of virtual machines executed by the computing resources for providing one or more services, usage metrics are collected from network components of the network resources operating with respect to traffic that passes through the network resources as a result of the plurality of virtual machines executed by the computing resources. The virtual machine workload cost is computed from the usage metrics.

In addition, an apparatus is provided comprising a network interface unit configured to enable communications over a network; and a processor coupled to the network interface unit. The processor is configured to receive usage metric data from network components operating with respect to network traffic generated as a result of a plurality of virtual machines executed by computing resources coupled to the network resources to provide one or more services; and compute a virtual machine workload cost from the usage metric data.

Further still, a computer readable memory medium is provided that stores instructions that, when executed by a processor, cause the processor to receive usage metric data from network components operating with respect to network traffic generated as a result of a plurality of virtual machines executed by computing resources coupled to the network resources to provide one or more services; and compute a virtual machine workload cost from the usage metric data.

The above description is by way of example only.

What is claimed is:

1. A method comprising:
at a network management appliance that is in communication with network resources and computing resources used by a plurality of virtual machines executed by the computing resources for providing one or more services, collecting usage metrics from network components of the network resources operating with respect to traffic that passes through the network resources as a result of the plurality of virtual machines executed by the computing resources; and
computing a virtual machine workload cost from the usage metrics at a core access switch level of the network resources based on the usage metrics collected for the network traffic passing through the network components of the network resources.

2. The method of claim 1, wherein computing the cost at the core switch level comprises computing a cost for each of a plurality of metrics associated with traffic that passes through network components associated with corresponding ports of one or more core switches of the network resources.

3. The method of claim 2, wherein the computing the cost at the core switch level comprises computing a cost for each of a plurality of metrics associated with traffic that passes through a firewall, a load balancer and access switches of the network resources.

4. The method of claim 2, wherein computing the cost at the core switch level comprises computing a core cost value for each of the plurality of metrics by multiplying a value for a metric collected for each of the plurality of network components to produce an aggregated metric value for the particular metric, and multiplying the aggregated metric value by a cost value associated with each network component from which the metric was collected to produce a core cost value for the metric.

5. The method of claim 4, and further comprising computing a sum of the plurality of core cost values computed for each of the plurality of metrics, and monitoring the sum over time.

6. The method of claim 5, wherein monitoring comprises generating and storing data representing a moving average of the sum of the plurality of core cost values over a period of time and of a moving peak of the sum of the plurality of core cost values over the period of time, and computing a difference variance between the moving average and the moving peak, and wherein computing the virtual machine workload cost is based on the difference variance between the moving average and the moving peak.

7. The method of claim 1, and further comprising generating a control signal that is fed back to the computing resources to adjust computing resources allocation to support the one or more services based on the virtual machine workload cost.

8. The method of claim 7, wherein generating the control signal comprises generating information representing an adjustment in terms of the number of virtual machines or fraction thereof allocated for the one or more services.

9. The method of claim 1, and further comprising computing an incremental virtual machine chargeback cost for the one or more services based on the virtual machine workload cost.

10. An apparatus comprising:
a network interface unit configured to enable communications over a network; and
a processor coupled to the network interface unit and configured to:
receive usage metric data from network components operating with respect to network traffic generated as a result of a plurality of virtual machines executed by computing resources coupled to the network resources to provide one or more services; and
compute a virtual machine workload cost from the usage metric data at a core switch level of the network components based on the usage metric data collected for the network traffic passing through the network components.

11. The apparatus of claim 10, wherein the processor is configured to compute the cost at the core switch level by computing a cost for each of a plurality of usage metrics associated with traffic that passes through the network components that are associated with corresponding ports of one or more core switches.

12. The apparatus of claim 11, wherein the processor is configured to compute the cost at the core switch level by computing a core cost value for each of a plurality of usage metrics by multiplying a value for a usage metric collected for the network components associated with corresponding ports of the one or more access switches to produce an aggregated metric value for the particular usage metric, and multiplying the aggregated metric value by a cost value associated with each network component from which the usage metric was collected to produce a core cost value for the usage metric.

13. The apparatus of claim 12, wherein the processor is configured to compute a sum of the plurality of core cost values computed for the plurality of usage metrics, generate and store data representing a moving average of the sum of the plurality of core cost values over a period of time and of a moving peak of the sum of the plurality of core cost values over the period of time, compute a difference variance between the moving average and the moving peak, and compute the virtual machine workload cost based on the difference variance between the moving average and the moving peak.

14. A computer readable memory medium storing instructions that, when executed by a processor, cause the processor to:
receive usage metric data from network components operating with respect to network traffic generated as a result of a plurality of virtual machines executed by computing resources coupled to the network resources to provide one or more services; and
compute a virtual machine workload cost from the usage metric data at a core switch level of the network components based on the usage metric data collected for the network traffic passing through the network components.

15. The computer readable memory medium of claim 14, wherein the instructions that cause the processor compute the cost at the core access switch level comprises instructions that, when executed by the processor, cause the processor to computing a cost for each of a plurality of usage metrics associated with traffic that passes through the network components that are associated with corresponding ports of one or more core switches.

16. The computer readable memory medium of claim 15, wherein the instructions that cause the processor compute the cost at the core switch level comprises instructions that, when executed by the processor, cause the processor to compute a core cost value for each of a plurality of usage metrics by multiplying a value for a usage metric collected for the network components associated with corresponding ports of the one or more switches to produce an aggregated metric value for the particular usage metric, and multiplying the aggregated metric value by a cost value associated with each network component from which the usage metric was collected to produce a core cost value for the usage metric.

17. The computer readable memory medium of claim 15, and further comprising instructions that, when executed by the processor, cause the processor compute a sum of the plurality of core cost values computed for the plurality of usage metrics, generate and store data representing a moving average of the sum of the plurality of core cost values over a period of time and of a moving peak of the sum of the plurality of core cost values over the period of time, compute a difference variance between the moving average and the moving peak, and compute the virtual machine workload cost based on the difference variance between the moving average and the moving peak.

18. The method of claim 1, wherein computing the virtual machine workload cost is based in part on an initial virtual machine cost×(1+Kadj), where the initial virtual machine cost is a fixed static amount that is calculated from a balance sheet for a data center, and Kadj is a virtual machine workload adjustment factor that is based on an availability factor that addresses the additional overhead of the computing resources to be provisioned for each virtual machine class to ensure there is sufficient processing capacity available to address service demands.

19. The apparatus of claim 10, wherein the processor is configured to compute the virtual machine workload cost base in part on an initial virtual machine cost×(1+Kadj), where the initial virtual machine cost is a fixed static amount that is calculated from a balance sheet for a data center, and Kadj is a virtual machine workload adjustment factor that is based on an availability factor that addresses the additional overhead of the computing resources to be provisioned for each virtual machine class to ensure there is sufficient processing capacity available to address service demands.

20. The computer readable memory medium of claim 14, wherein the instructions that cause the processor to compute comprise instructions that cause the processor to compute the virtual machine workload cost base in part on an initial virtual machine cost×(1+Kadj), where the initial virtual machine cost is a fixed static amount that is calculated from a balance sheet for a data center, and Kadj is a virtual machine workload adjustment factor that is based on an availability factor that addresses the additional overhead of the computing resources to be provisioned for each virtual machine class to ensure there is sufficient processing capacity available to address service demands.

\* \* \* \* \*